(12) United States Patent
Yang et al.

(10) Patent No.: US 7,909,969 B2
(45) Date of Patent: Mar. 22, 2011

(54) CORROSION RESISTANT GAS DIFFUSION LAYER WITH A MICRO PROTECTIVE LAYER FOR ELECTROCHEMICAL CELLS

(75) Inventors: Wen-Hui Yang, Taoyuan (TW); Fu-Chen Kuo, Luzhou (TW); Chao-Yang Liu, Ta-Li (TW); Chi-Chia Fan, Longtan Township, Taoyuan County (TW)

(73) Assignee: General Optics Corporation, Taoyuan County (TW)

( * ) Notice: Subject to any disclaimer, the term of this patent is extended or adjusted under 35 U.S.C. 154(b) by 443 days.

(21) Appl. No.: 12/113,926

(22) Filed: May 1, 2008

(65) Prior Publication Data

US 2009/0272645 A1 Nov. 5, 2009

(51) Int. Cl.
| | |
|---|---|
| C25B 11/03 | (2006.01) |
| C25B 11/04 | (2006.01) |
| C25B 11/06 | (2006.01) |
| C25B 9/10 | (2006.01) |
| C25B 9/16 | (2006.01) |
| H01M 8/00 | (2006.01) |
| H01M 8/10 | (2006.01) |

(52) U.S. Cl. ........ 204/283; 204/252; 429/480; 429/481; 429/483; 429/529; 429/534
(58) Field of Classification Search .................. 204/283, 204/252; 429/480, 481, 483, 529, 534
See application file for complete search history.

(56) References Cited

U.S. PATENT DOCUMENTS 5,460,896 A * 10/1995 Takada et al. ................. 429/423
2006/0222926 A1* 10/2006 Sato ................................ 429/34
* cited by examiner

*Primary Examiner* — Bruce F Bell
(74) *Attorney, Agent, or Firm* — Chun-Ming Shih

(57) ABSTRACT

A gas diffusion layer with a micro protective layer is utilized in the electrochemical cells. The cell mainly includes end plates, current collectors, flow field plates, gas diffusion layers, catalyst layers, a proton exchange membrane and a circuit unit. When the cell functions as a fuel cell, hydrogen reacts with oxygen to generate electricity and water. Reversely, when the cell functions as a water electrolysis cell, water was decomposed electrolytically to produce hydrogen and oxygen gases. In this manner, the present invention particularly has the gas diffusion layer to be coated with a micro protective layer so as to prevent the gas diffusion layer from being corroded by active oxygen species generated within the oxygen electrode under the catalysis during water electrolysis operation.

15 Claims, 3 Drawing Sheets

CORROSION RESISTANT GAS DIFFUSION LAYER WITH A MICRO PROTECTIVE LAYER FOR ELECTROCHEMICAL CELLS

BACKGROUND OF THE INVENTION

1. Field of the Invention

The present invention relates to a gas diffusion system of electrochemical cells, more particularly to a carbon-based gas diffusion layer with a micro protective layer which prevents the gas diffusion layer from corrosion.

2. Description of the Related Art

Recently, petrochemical products become one of the essential necessaries in daily lives along with the increment of population and the development of the technology. However, people tend to seek for substitute energy with lower contamination due to the shortage of the oil energy, the rising of the price index and the threat of the global warming.

Therefore, fuel cells have received high recognition as a future energy conversion system due to their conversion efficiency and low emission. Fuel cells can directly convert the chemical energy into the electric energy, by electrochemically reacting hydrogen with oxygen to produce electricity and water, which is considered to be friendly to the environment. Furthermore, the water can also be electrolytically decomposed into hydrogen and oxygen gases by means of water electrolysis method. Thus, the combination of a fuel cell and a water electrolysis cell is perfectly referred to as a regenerative fuel cell.

Nevertheless, the conventional fuel cell is apt to encroached while proceeding to water electrolysis. As shown in FIG. 1, a conventional fuel cell 1 mainly consists of end plates 2, 2', current collectors 3, 3', flow field plates 4, 4', gas diffusion layers 5, 5', catalyst layers 6, 6', a proton exchange membrane 7 and a circuit unit 8; wherein, the end plates have exits and entrances disposed thereon for gases and water; the gas diffusion layer 5 or 5' is used for evenly spreading out the gases therein and conducting electrons, usually fabricated by either porous carbon materials (e.g. carbon paper or carbon cloth) or, by metal materials. The carbon-based diffusion layer is light, cheap, and small but tends to react with active oxygen species under the conditions of high temperature or high potential, and is converted into carbon monoxide or carbon dioxide, which results in the corrosion of the diffusion layer; on the other hand, the metallic diffusion layer has better corrosion resistance, but it can still be oxidized to form a low conductive layer on its surface. Besides, it's costly and heavy. In this manner, the carbonic diffusion layer is typically applied to fuel cells and the metallic layer is utilized in water electrolysis cells.

Due to the material issues, the conventional invention requires larger spaces and higher expense to dispose separate devices for the above two energy conversions, for instance of the fuel cell device solely generating electricity and the water electrolysis cell device solely producing hydrogen and oxygen gases, thus still needs improvements.

SUMMARY OF THE INVENTION

The object of the present invention is to provide a carbon-based gas diffusion layer in an electrochemical cell with a micro protective layer which facilitates to prevent the carbon molecule of the gas diffusion layer from being approached to and oxidized by active oxygen species.

The fuel cell in conformity with the present invention essentially consists of end plates, current collectors, flow field plates, gas diffusion layers, catalyst layers, a proton exchange membrane and a circuit unit. In particularly, the gas diffusion layer used for evenly spreading out the gases therein and conducting electrons is made up of carbon materials. The present invention is to coat a micro protective layer on the gas diffusion layer so as to avoid the combination of the carbon molecules and the active oxygen species and thus prevent the diffusion layer from being corroded and oxidized.

In the embodiments, the operation Of a fuel cell is as follows. Hydrogen gas and oxygen gas are respectively introduced along separate entrances into the body of the cell, sequentially pass through the end plates, current collectors, flow field plates, gas diffusion layers and then to the catalyst layers, so that the catalyst assists in decomposing the hydrogen gas into hydrogen ions and electrons. Further the hydrogen ions are transferred to the oxygen electrode by passing through the proton exchange membrane, and the electrons are moved across the circuit unit via the current collector to the oxygen electrode, thus the hydrogen ions and the electrons can react with the oxygen gas to compound into water, which is further discharged with the exhaust from the exit.

The water electrolysis cell uses the same configurations as the fuel cell. Wherein, de-ionized water is fed into the cell and external electricity is applied to it via the circuit unit. Water is split into hydrogen ions and oxygen gas due to the reaction facilitated by the electricity from the circuit unit. The oxygen gas then is discharged from the exit, and the hydrogen ions are transferred from the oxygen electrode across the proton exchange membrane to the hydrogen electrode and combine with the electrons to produce hydrogen gas, which is further discharged from another exit.

Theoretically, the water electrolysis method generally requires the potential to be greater than 1.5 volts; During the operation, the carbon-based diffusion layer is apt to react with active oxygen species, such as hydroxyl free radicals or oxygen atoms, and would further be converted into carbon monoxide or carbon dioxide. Therefore the present invention has the micro protective layer adhering to the gas diffusion layer in order to convert the active oxygen species into non-active oxygen gas before the carbon molecule is oxidized thereby. Consequently, the present invention can function as a fuel cell by electrochemically reacting hydrogen with oxygen to generate electricity and also as a water electrolysis cell by electrolytically decomposing water into hydrogen and oxygen gases. Thus, the above two energy conversions can be achieved without disposing separate devices and the cost is reduced as well.

The advantages of the present invention over the known prior arts will become more apparent to those of ordinary skilled in the art by reading the following descriptions with the relating drawings.

DETAILED DESCRIPTION OF THE PREFERRED EMBODIMENTS

Figure 1:
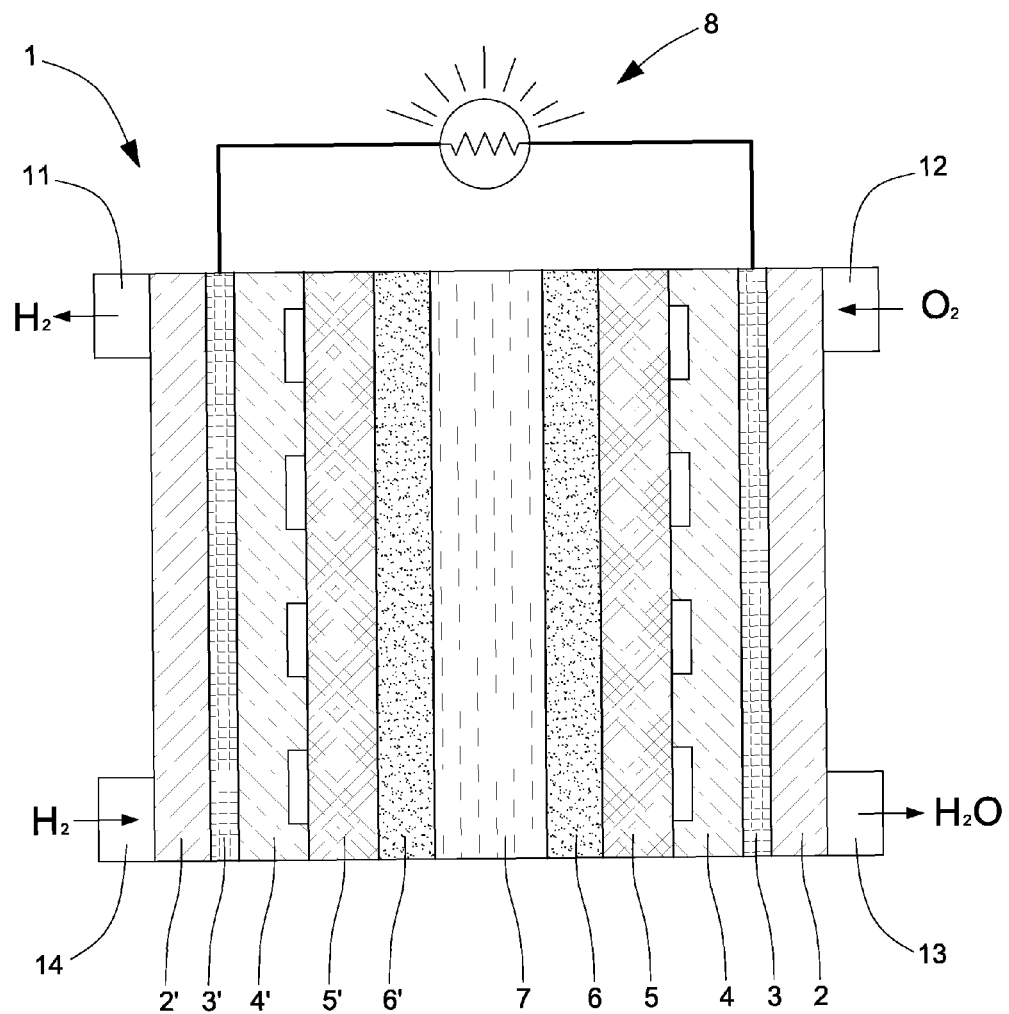
FIG. 1 is a schematic view of a conventional fuel cell.

Referring to FIG. 1, a conventional fuel cell bold 1 comprises end plates 2, 2', current collectors 3, 3', flow field plates 4, 4', carbon-based gas diffusion layers 5, 5' for distributing gases and conducting electrons, catalyst layers 6, 6' where reactions of oxygen and hydrogen take place, respectively, a proton exchange membrane 7 for the hydrogen ions to travel therethrough, and a circuit unit 8 connected to the current collectors 3, 3'; wherein, the end plate bold 2' has a hydrogen gas exit 11, and entrance 14, end plate 2 has an oxygen gas entrance 12, and exit 13, disposed thereon, separately.

Figure 2:
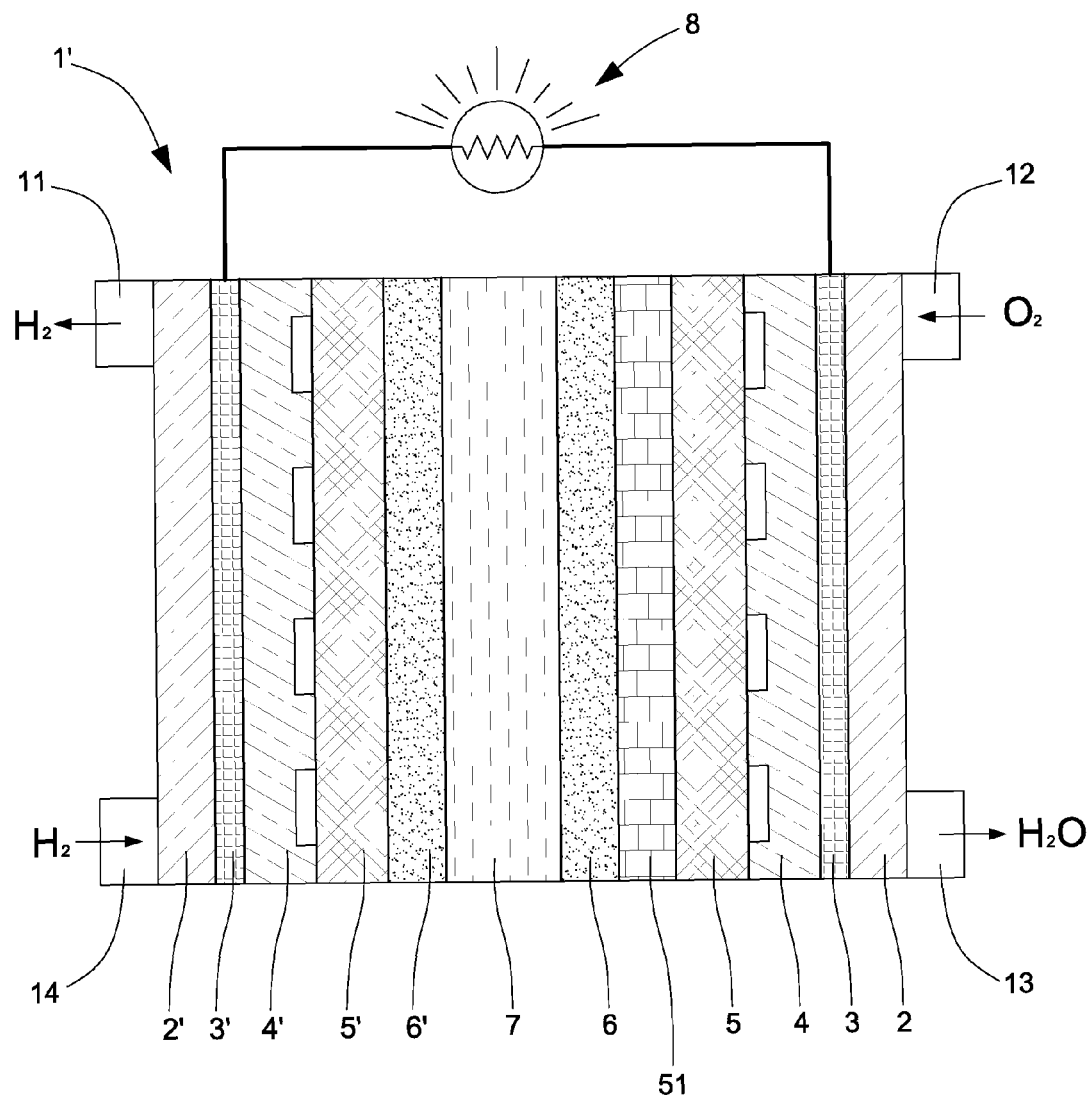
FIG. 2 is a schematic view of a preferred embodiment of the present invention used for a fuel cell.

Referring to FIG. 2, a preferred embodiment of the present invention for applying to a fuel cell, a micro protective layer 51 is coated over a surface of the gas diffusion layer bold 5. The micro protective layer 51 is compounded from corrosion-resistant metallic powders, such as titanium or titanium alloy, and a highly active catalysts so as to prevent the diffusion layer 5 from being corroded and oxidized.

Hydrogen gas is initially introduced into the cell 1' along the entrance 14 while oxygen gas is also introduced therein along the entrance 12, the hydrogen gas sequentially passes through the end plate bold 2', the current collector 3', the flow field plate 4', the gas diffusion layer 5' and thence to the catalyst layer 6', so that the hydrogen gas is decomposed into hydrogen ions and electrons under the catalysis of the catalyst layer 6'. Further the hydrogen ions are transferred across the proton exchange membrane 7 to the oxygen electrode, and simultaneously the electrons are collected at the current collector 3' and enter into the oxygen electrode via the circuit unit bold 8. Additionally, oxygen gas passes through the end plate 2, the current collector 3, the flow field plate 4, the gas diffusion layer 5, thence to the catalyst layer 6, where the oxygen gas can electrochemically react with the hydrogen ions and electrons to generate electricity and water. The water is finally discharge from the water exit 13.

Figure 3:
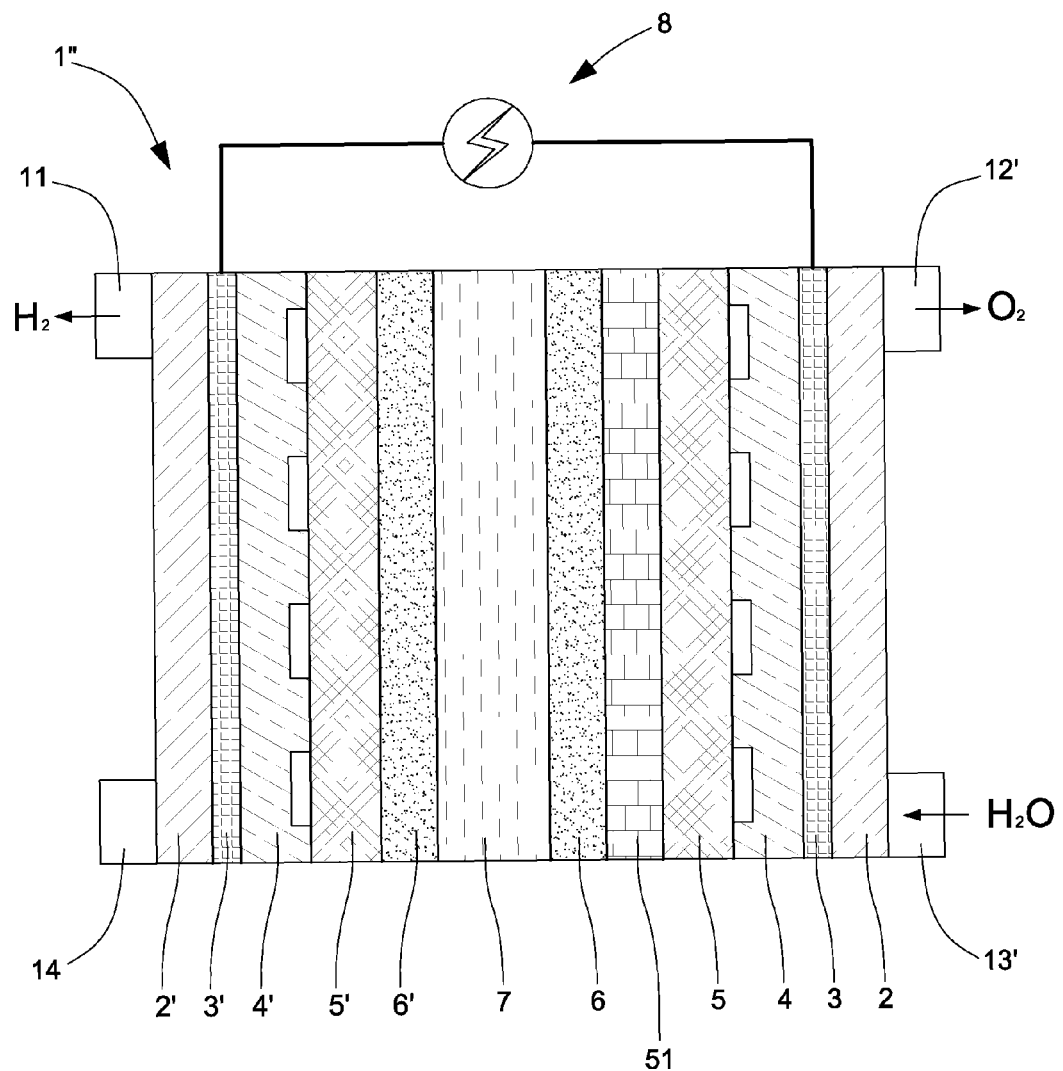
FIG. 3 is a schematic view of another preferred embodiment of the present invention used for a water electrolysis cell.

Another embodiment illustrated in FIG. 3 for applying to water electrolysis cell, de-ionized water is initially fed into the cell 1" along the water inlet 13' and thence to the catalyst layer 6. In this manner, the water is electrolytically decomposed into hydrogen ions and oxygen gas by passing electricity of the circuit unit 8 through it. The oxygen gas then is discharged from the exit 12', and subsequently the hydrogen ions are transferred from the oxygen electrode across the proton exchange membrane 7 to the hydrogen electrode and combine with the electrons to generate hydrogen gas, which is hence discharged from the exit 11'.

To sum up, the present invention takes advantages of the micro protective layer which is essentially consisted of highly active catalysts for catalyzing active oxygen species to become non-active oxygen gas, and corrosion-resistant metallic powders for assisting said catalysts to be tightly adhered to the gas diffusion layer, and reducing the possibility of the carbon molecule contacting with the active oxygen species, thereby efficiently preventing the gas diffusion layer from being oxidized and corroded. Therefore, the present invention can be applied to both fuel cell and water electrolysis cell, so as to obtain the above two energy conversions without disposing separative devices and reduce the cost.

While we have shown and described the embodiments in accordance with the present invention, it should be clear to those skilled in the art that further embodiments may be made without departing from the scope of the present invention.

We claim:

1. A water electrolysis cell comprising a gas diffusion layer disposed for distributing gas therethrough and coated with a micro protective layer so as to prevent said gas diffusion layer from being oxidized and corroded, wherein said micro protective layer is compounded from corrosion-resistant metallic powders and highly active catalysts.

2. The water electrolysis cell as claimed in claim 1, further comprising end plates, current collectors, flow field plates, catalyst layers, a proton exchange membrane and a circuit unit.

3. The water electrolysis cell as claimed in claim 1, wherein said corrosion-resistant metallic powders and said highly active catalysts are coated on a surface of said gas diffusion layer, so that said micro protective layer is able to adhere thereto through heating treatments.

4. The water electrolysis cell as claimed in claim 1, wherein said corrosion-resistant metallic powders are titanium or titanium alloys for reducing the surface area of carbon to be in contact with active oxygen species and assisting said highly active catalysts to be tightly adhered to said gas diffusion layer.

5. The water electrolysis cell as claimed in claim 1, wherein said highly active catalysts catalyze active oxygen species to become non-active oxygen gas.

6. A corrosion resistant gas diffusion layer comprising a gas diffusion layer disposed for distributing gas therethrough and coated with a micro protective layer so as to prevent said gas diffusion layer from being oxidized and corroded, wherein said micro protective layer is compounded from corrosion-resistant metallic powders and highly active catalysts.

7. A fuel cell comprising a gas diffusion layer to assist in providing channels for reactive gases and reactants to travel therethrough and for conducting electrons, said gas diffusion layer being disposed for distributing gas therethrough and coated with a micro protective layer so as to prevent said gas diffusion layer from being oxidized and corroded, wherein said micro protective layer is compounded from corrosion-resistant metallic powders and highly active catalysts.

8. The fuel cell as claimed in claim 7, further comprising end plates, current collectors, flow field plates, catalyst layers, a proton exchange membrane and a circuit unit.

9. The fuel cell as claimed in claim 7, wherein said corrosion-resistant metallic powders and said highly active catalysts are coated on a surface of said gas diffusion layer, so that said micro protective layer is able to adhere thereto through heating treatments.

10. The fuel cell as claimed in claim 7, wherein said corrosion-resistant metallic powders are titanium or titanium alloys for reducing the surface area of carbon to be in contact with active oxygen species and assisting said highly active catalysts to be tightly adhered to said gas diffusion layer.

11. The fuel cell as claimed in claim 7, wherein said highly active catalysts catalyze active oxygen species to become non-active oxygen gas.

12. The corrosion resistant gas diffusion layer as claimed in claim 6, wherein said gas diffusion layer is made up of carbon materials, either a carbon cloth or a carbon paper.

13. The corrosion resistant gas diffusion layer as claimed in claim 6, wherein said corrosion-resistant metallic powders and said highly active catalysts are coated on a surface of said gas diffusion layer, so that said micro protective layer is able to adhere thereto through heating treatments.

14. The corrosion resistant gas diffusion layer as claimed in claim 6, wherein said corrosion-resistant metallic powders are titanium or titanium alloys for reducing the surface area of carbon to be in contact with active oxygen species and assisting said highly active catalysts to be tightly adhered to said gas diffusion layer.

15. The corrosion resistant gas diffusion layer as claimed in claim 6, wherein said highly active catalysts catalyze active oxygen species to become non-active oxygen gas.

* * * * *